United States Patent Office 3,554,888
Patented Jan. 12, 1971

3,554,888
METHOD OF ELECTROPAINTING FROM AN EMULSION
Jerry T. Seitz, Midland, Mich., assignor to The Dow Chemical Company, Midland, Mich., a corporation of Delaware
No Drawing. Filed Sept. 5, 1968, Ser. No. 757,793
Int. Cl. B01k 5/02
U.S. Cl. 204—181                                                10 Claims

ABSTRACT OF THE DISCLOSURE

An article is electropainted by electrophoresis in an aqueous emulsion containing pigment particles and a polymeric material. The polymeric material comprises a dispersion of pigment particles and an at least partially neutralized dicarboxylic acid of a block copolymer of an α-methyl styrene and an aliphatic conjugated diolefin such as 1,3-butadiene characterized by having a relatively low degree of polymerization and, as a second polymeric material, an at least partially neutralized dicarboxylic acid of a block copolymer of α-methyl styrene and an aliphatic conjugated diolefin such as 1,3-butadiene characterized by having a relatively high degree of polymerization. The article is electropainted by disposing it in an aqueous electrodeposition bath containing the aqueous emulsion and applying a voltage between the article and a cathode disposed within the bath to cause direct current flow through the bath and thus effect a migration of the pigment particles and polymeric materials to the surfaces of the article.

---

This invention relates to electropainting. In one aspect, this invention relates to methods of electrodepositing film-forming polymeric materials and pigments from an emulsion in an aqueous bath characterized by having the polymeric materials disposed within the bath in the form of suspended particles which are insoluble in the aqueous bath medium. In another aspect, this invention relates to methods of electropaintaing an anionic dispersing agent and pigment together with a polymeric material on a substrate which has been suspended as an anode in an electrodeposition bath which contains the anionic dispersing agent, pigment, and polymeric material as suspended particles in an aqueous emulsion.

The prior art practices for electrodepositing pigments on metal articles by disposing the article in an electrodeposition bath containing the pigments in the form of fine particles involves the use of wetting agents or surfactants to achieve stability of the pigment particles in the bath medium. Typical wetting agents generally employed for this purpose are non-ionic organic compounds such as the ethoxylated fatty amines. While such materials undoubtedly improve bath stability, they do not contribute to the overall electrodeposition process and frequently they are actually detrimental to the efficiency of the process. Moreover, since wetting agents of this type are neutral in the sense of being non-ionic they do not migrate with the pigment particles during the electrodeposition process and there is thus a tendency for the pigment particles to deposit unevenly and in some cases to gravitate to the bottom of the electrodeposition bath.

According to this invention, pigment particles are deposited evenly and uniformly on an article suspended as an anode in an electrodeposition bath by means of an anionic dispersing agent in the form of colloidal particles present in the bath as an emulsion. The anionic dispersing agent functions as a vehicle during the electrodeposition process to shepherd the pigment particles during their travel to the article which is to be electropainted. The anionic dispersing agents of this invention also have the unique ability to become a part of the coating formed on the article such that they can be cross-linked with themselves or with other electrodeposited polymeric materials as will be more fully hereinafter described.

The anionic dispersing agents of this invention comprise a dicarboxylic acid of a block copolymer of α-methyl styrene and an aliphatic conjugated diolefin having between 4 and 6 carbon atoms per molecule, inclusive, characterized by having a relatively low degree of polymerization. The dicarboxylic acid block copolymers employed as the anionic dispersing agents in the practice of this invention are represented by the formula:

HOOC—(B)$_y$(A)$_x$(B)$_y$—COOH wherein A represents a molecule of the α-methyl styrene after it has become a part of the polymer, $x$ is an integer of between 3 and 6, inclusive, each B represents a molecule of the aliphatic conjugated diolefin after it has become a part of the polymer, each $y$ is an integer of between 1 and about 18, and the HOOC— and —COOH portions represent carboxylic acid groups attached to the ends of the polymer. The dicarboxylic acid block copolymer anionic dispersing agents in the form of colloidal particles in the aqueous emulsion are at least partially neutralized by means of a suitable neutralizing agent such as, for example, an alkali metal such as sodium or potassium or a suitable primary, secondary, or tertiary organic amine.

The additional polymeric material which is electrodeposited along with the anionic dispersing agent and the pigment particles in the practice of this invention comprises a dicarboxylic acid of a block copolymer of α-methyl styrene and an aliphatic conjugated diolefin having between 4 and 6 carbon atoms per molecule, inclusive, characterized by having a relatively high degree of polymerization as compared to the degree of polymerization of the dicarboxylic acid block copolymer anionic dispersing agents of the invention. The dicarboxylic acid block copolymers having the relatively high degree of polymerization are represented by the formula:

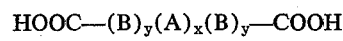

HOOC—(B)$_y$(A)$_x$(B)$_y$—COOH wherein A represents a molecule of the α-methyl styrene after it has become a part of the polymer, $x$ is an integer of between 3 and 6, inclusive, each B represents a molecule of the aliphatic conjugated diolefin after it has become a part of the polymer, each $y$ is an integer of between about 23 and about 60, and the HOOC— and —COOH portions represent carboxylic acid groups attached to the ends of the polymer. The dicarboxylic acid block copolymers having the relatively high degree of polymerization are neutralized by means of any suitable neutralizing agent such as, for example, an alkali metal such as sodium or potassium or a suitable primary, secondary, or tertiary organic amine.

The degree of polymerization (DP) of the dicarboxylic acid block copolymers herein disclosed is defined as the sum total of the number of α-methyl styrene molecules and the number of aliphatic conjugated diolefin molecules in a polymer molecule. The terminal carboxylic acid groups in the block copolymer are not taken into consideration when calculating the DP for a particular block copolymer. Thus, for example, a dicarboxylic acid block copolymer having α-methyl styrene tetramer and two molecules of an aliphatic conjugated diolefin on each side of the α-methyl styrene tetramer has a DP of 8.

While the dicarboxylic acid block copolymers having the relatively high degree of polymerization are very good electrodeposition polymers which can be electrodeposited from an aqueous emulsion to provide an excellent protective film, when electropainting by using pigment particles it has been discovered, in accordance with this invention, that dicarboxylic acid block copolymers having a relatively low degree of polymerization must be employed as an anionic dispersing agent in order to obtain a satisfactory product in terms of uniformity of the pigment particles on the coated article.

Accordingly, it is an object of this invention to provide a protective coating containing pigment particles on a metal surface.

Another object of this invention is to provide a method of electrodepositing pigment particles and a polymeric material from an emulsion system characterized by having the polymeric material in the form of colloidal particles suspended in the emulsion.

A further object of this invention is to provide a method of electrodepositing an anionic dispersing agent and pigment particles along with a polymeric material to provide a coating which can be heated to cross-link the anionic dispersing agent and the polymeric material.

Yet another object of this invention is to provide an electrodeposited coating of a polymeric material containing pigment particles which is tightly adhering, attractive in appearance, resistant to corrosion, uniform in thickness, and free of ester linkages which if present could hydrolize and destroy the effectiveness of the coating.

These and other objects of the invention will become apparent to one skilled in the art after studying the following detailed description and the appended claims.

In the practice of this invention, the anionic dispersing agents in the form of the relatively low DP dicarboxylic acid block copolymers have a DP of between 5 and about 40, as indicated by the general formula. The dicarboxylic acid block copolymers having a relatively high DP which are electrodeposited along with the anionic dispersing agents and the pigment particles have a DP of between about 50 and about 120, as indicated by the general formula.

It has been discovered that the relatively low DP dicarboxylic acid block copolymers effectively serve as a vehicle by which the pigment particles are transmitted to the article disposed as an anode in the electrodeposition bath. It has similarily been discovered that the relatively high DP dicarboxylic acid block copolymers are not suitable for electropainting by means of pigment particles. While the invention is not to be predicated upon or bound by any particular theory, the discovery of using the relatively low DP dicarboxylic acid block copolymers as an ionic dispersion agent which functions to transmit the pigment particles to the anode in the electrodeposition bath can probably be attributed to the fact that the low DP dicarboxylic acid block copolymers have relatively short polymer chains which are adsorbed by the individual pigment particles. Since the low DP dicarboxylic acid block copolymers are of relatively short chain length, it is believed that the individual pigment particles can accommodate more of the low DP block copolymer molecules by adsorption thereby providing a greater number of carboxylic acid groups on each pigment particle. The presence of a higher number of carboxylic acid groups on each pigment particle which can be neutralized results in better migration of the particle to the anode thus resulting in an overall increase in the efficiency of the electrodeposition process.

Another advantage realized by employing the anionic dispersing agents of this invention is the ability to control their degree of neutralization and hence the zeta potential of the anionic dispersing agents. By controlling the zeta potential in this manner, the velocity of the anionic dispersing agents including the pigment particles can be controlled as they travel through the electrodeposition bath to the anode. This advantage cannot be realized with the non-ionic wetting agents or surfactants according to the teachings of the prior art. And, as previously indicated, the anionic dispersing agents in the form of the relatively low DP dicarboxylic acid block copolymer not only become an integral part of the coating which is deposited on the article but they also can be cross-linked with the relatively high DP dicarboxylic acid block copolymers which are electrodeposited. This can be accomplished by removing the article from the electrodeposition bath after the electrodeposition is complete and then applying heat to the article such as in a hot air furnace or the like to raise the temperature of the article to between about 250° and 350° F. to cross-link the electrodeposited block copolymers. This results in an excellent protective coating resistant to the effect of corosion and the like.

The method of electropainting an article in an electrodeposition bath by electrophoresis according to this invention comprises the steps of dispersing in said bath as an aqueous emulsion a dispersion comprising pigment particles and an at least partially neutralized anionic dispersing agent comprising a relatively low DP dicarboxylic acid block copolymer; dispersing in said bath as an aqueous emulsion an at least partially neutralized, relatively high DP dicarboxylic acid block copolymer; disposing the article which is to be electropainted in said bath as an anode in electrical contact with the aqueous emulsion in the bath and in electrical contact with a cathode in electrical contact with the aqueous emulsion within the bath; and applying a voltage between the article and the cathode to cause direct current flow through the bath and thereby electrodeposit the dispersion of pigment particles and the relatively low DP dicarboxylic acid block copolymer and electrodeposit the relatively high DP dicarboxylic acid block copolymer on the article.

Any suitable neutralizing agent can be used to at least partially neutralize the carboxylic acid groups present on the low DP and on the high DP dicarboxylic acid block copolymers. Exemplary neutralizing agents which can be employed include any alkali metal hydroxide such as potassium hydroxide or sodium hydroxide. Exemplary organic amines suitable for neutralizing the carboxylic acid groups can be any mono-, di-, or tri-alkyl amines having up to about 8 carbon atoms in each of the alkyl radicals such as, for example, monoethylamine, diethylamine, triethylamine, dioctylamine, trioctylamine, dipentylamine, tripentylamine, and the like. The amount of neutralizing agent employed is that sufficient to cause the anionic dispersing agent and the relatively high DP dicarboxylic acid block copolymer to electrodeposit. If desired, the neutralizing agent can be used in an amount sufficient to cause up to about 100 percent neutralization of the dicarboxylic acid groups. Generally, the neutralizing agent is used in an amount sufficient to neutralize between about 30 and about 70 percent of the carboxylic acid groups.

While the neutralizing agent can be added to the aqueous emulsion containing the anionic dispersing agent and the relatively high DP dicarboxylic acid block copolymer at any convenient time during preparation of the emulsion, it is generally preferred that the neutralizing agent be blended with the ingredients prior to their introduction into the electrodeposition bath in order to insure good contacting between the materials. As previously indicated, the neutralizing agent can be used to control the zeta potential and hence the velocity of the anionic dispersing agent in the electrodeposition bath.

An important advantage realized by electrodepositing the dicarboxylic acid block copolymers of this invention is attributable to the low acid number or acid value of the relatively high DP dicarboxylic acid block copolymers as compared to the relatively high acid numbers of the polymers electrodeposited according to the teachings of the prior art. The acid number is the amount of potassium hydroxide in milligrams necessary to completely neutralize one gram of polymer. The advantage of electrodepositing a polymer having a low acid number results in better electrical efficiency during the electrodeposition process, the use of less neutralizing agent and hence the accumulation of lower amounts of neutralizing ions in the electrodeposition bath, and thicker and more uniform polymer coatings. The relatively high DP dicarboxylic acid block copolymers of this invention have an acid number between about 18 and about 37.

Any suitable conductive article can be electrodeposited by the method of this invention such as, for example, metal articles, conductive non-metallic articles, and the like. Exemplary metal substrates which can be electropainted include aluminum, steel, bondarized steel, magnesium, iron and the like. The metallic articles which can be electropainted can be in the form of automobile bodies, containers, metal strips or sheets for use in fabricating receptacles and packages, flashing materials for building construction, and the like.

The voltage applied between the article to be electropainted and the cathode can be any minimum operable voltage with a maximum voltage of up to about 300 volts. The walls of the electrodeposition bath can serve as a cathode or separate cathodes can be disposed within the bath if desired. It is generally preferred to employ separate cathodes which can be removed for cleaning at periodic intervals.

The aqueous emulsion in the electrodeposition bath can have up to about 30 percent by weight solids. This includes the dispersion of pigment particles and relatively low DP dicarboxylic acid block copolymer anionic dispersing agent and the relatively high DP dicarboxylic acid block copolymer. The pH of the electrodeposition bath is generally maintained within the range of between about 7 and about 10. The electrodeposition bath is preferably maintained at a temperature of between about 40° and 200° F.

The conditions for electropainting according to the method of this invention are largely a matter of personal choice dependent upon such factors as, for example, the size and shape of the article to be electropainted, the percent solids, the size and shape of the electrodeposition bath, and the like. In this regard, the conditions stated herein are intended to be exemplary only and should not be construed as limiting of the invention.

The relatively low DP dicarboxylic acid block copolymer anionic dispersing agent is preferably employed only in an amount sufficient to effectively transmit the pigment particles to the article which is to be electropainted. In general, the relatively low DP dicarboxylic acid block copolymer is employed in an amount up to about 15 percent by weight based upon the total weight of the dispersion of the relatively low DP dicarboxylic acid block copolymer and the pigment particles. Thus, as regards the dispersion of pigment particles and relatively low DP dicarboxylic acid block copolymers, the pigment particles are present in an amount of at least 85 percent by weight based upon the total weight of the dispersion.

Since the relatively high DP dicarboxylic acid block copolymer provides the most effective coating material, it is generally preferred that the anionic dispersing agent in the form of the relatively low DP dicarboxylic acid block copolymer be employed in a minimum amount consistent with producing a satisfactory product. The weight ratio of the pigment particles in the dispersion to the relative high DP dicarboxylic acid block copolymer is generally within the range of between about 0.25:1 to about 11.5:1. In general, the concentration of the pigment particles in the electrodeposited coating will be substantially the same as the concentration of the pigment particles in the bath. Of course, weight ratios of pigment particles to the relatively high DP dicarboxylic acid block copolymers outside of this range can be employed if desired.

The pigment particles which make up the dispersion with the anionic dispersing agent include single component pigments or mixtures of two or more pigments. Exemplary pigment materials include red iron oxide, leaded zinc oxide, zinc oxide, white lead, titanium dioxide, titanium calcium, and the like. The pigment particles can also be clays such as silica, talc, mica, kaolinite, calcium carbonate, ferric oxide, "brown" iron oxide, and the like. Chromium oxide green, graphite, carbon black, zinc chromate, lampblack, calcium lead chromate, alumina, and elemental metal powders such as aluminum, copper, magnesium, and zinc can also be employed as pigment materials. The pigment particles can be of any suitable and convenient size consistent with the production of a satisfactory product.

The relatively low DP dicarboxylic acid block copolymers and the relatively high DP dicarboxylic acid block copolymers can be obtained commercially or they can be prepared by any process such as that described in U.S. Pat. 3,346,666 granted Oct. 10, 1967, the disclosure of which is specifically incorporated herein by reference. While this patent describes a process for preparing the dicarboxylic acid block copolymers which are electrodeposited by the method of this invention, it is to be understood that this process for preparing the block copolymers is exemplary only and is not intended to be limiting of this invention.

The aqueous emulsion electrodeposited by this invention can be prepared by any suitable technique. It is generally preferred that the dispersion comprising the pigment particles and the at least partially neutralized anionic dispersing agent be blended separately to insure complete mixing before it is charged to the electrodeposition bath. Similarly, the at least partially neutralized relatively high DP dicarboxylic acid block copolymer is preferably emulsified with the deionized water prior to being charged to the electrodeposition bath. If desired, a suitable organic solvent can be used to break-up the dicarboxylic acid block copolymers prior to or during contact with the neutralizing agent. The organic solvent can then be flashed off or it can be blended with the deionized water to produce the aqueous emulsion containing the colloidal particles of dispersion and relatively high DP dicarboxylic acid block copolymers.

The following examples are illustrative of the electropainting method of this invention. It must be understood that these examples are for the purpose of illustration only and should not be construed as limiting of the invention.

EXAMPLE I

A partially neutralized anionic dispersing agent was prepared by blending together 1 part by weight deionized water, 2 parts by weight ethylene glycol n-butyl ether, 4 parts by weight dicarboxylic acid block copolymer of α-methyl styrene tetramer and 1,3-butadiene (polymerized in the 1–2 position to form pendant vinyl groups by the technique described in Pat. 3,346,666) having a DP of 14, and enough potassium hydroxide to neutralize 90 percent of the carboxylic acid groups of the block copolymer. The technique employed involved dissolving the potassium hydroxide in the deionized water-ethylene glycol n-butyl ether solution. The DP 14 dicarboxylic acid block copolymer was then added with agitation.

A dispersion of pigment particles and partially neutralized anionic dispersing agent was prepared by blending 8 parts by weight red iron oxide (R8098 marketed by The Charles Pfizer Co.), 1.2 parts by weight of the partially neutralized anionic dispersing agent prepared above, and 1 part by weight deionized water. The dispersion was mixed with an air stirrer using a high sheer agitator. The resulting product was in the form of a thick slurry.

An aqueous emulsion of relatively high DP dicarboxylic acid block copolymer was prepared by blending 1 part by weight ethylene glycol n-butyl ether, 17 parts by weight deionized water, 2 parts by weight dicarboxylic acid block copolymer of α-methyl styrene tetramer and 1,3-butadiene (polymerized in the 1–2 position to form a pendant vinyl group) having a DP of 50, and enough potassium hydroxide to neutralize 50 percent of the carboxylic acid groups of the DP 50 dicarboxylic acid block copolymer.

The previously prepared dispersion of red iron oxide and partially neutralized DP 14 dicarboxylic acid block copolymer was blended with the aqueous emulsion of DP 50 dicarboxylic acid block copolymer in different amounts to form several batches having different ratios of red iron oxide pigment to DP 50 dicarboxylic acid block copolymer. The materials blended well with agitation to produce an aqueous emulsion having the dicarboxylic acid resin particles and pigment particles uniformly dispersed. The several batches were individually charged to an electrodeposition bath and metallic articles of aluminum, steel, bondarized steel, and magnesium were electropainted by applying a potential of 96 volts across the several articles and a cathode disposed within the bath.

During electrodeposition of the several batches, the throwing power of the dicarboxylic acid block copolymer was measured and found to be about 6 inches in a tube having an inside diameter of 5/8 inch suspended vertically inside the bath. That is, the dicarboxylic acid block copolymers including the pigments electrodeposited to a height of 6 inches on the inside of the tube. The electrodeposition bath maintained its stability for a period of three weeks. The electrical efficiency for the process was calculated and found to be 20 coulombs per gram of material deposited. The electrodeposited coatings were measured and found to be about 0.5 mil thick and upon testing according to ASTM–B117 salt spray test procedures the coatings were found to exhibit excellent resistance to a 5% salt spray for a period of 500 hours.

EXAMPLE II

A partially neutralized anionic dispersing agent was prepared by blending together 10 grams deionized water, 300 grams ethylene glycol n-butyl ether, 61.5 grams potassium hydroxide, and 400 grams dicarboxylic acid block copolymer of $\alpha$-methyl styrene tetramer and 1,3-butadiene having a DP of 8. A dispersion of pigment particles and partially neutralized anionic dispersing agent was prepared by blending 6400 grams red iron oxide (R8098), 256 grams of the previously prepared partially neutralized anionic dispersing agent, and 2094 grams ethylene glycol n-butyl ether.

An aqueous emulsion of relatively high DP dicarboxylic acid block copolymer was prepared by blending 40 grams ethylene glycol n-butyl ether, 680 grams deionized water, 80 grams dicarboxylic acid block copolymer of $\alpha$-methyl styrene tetramer and 1,3-butadiene having a DP of 50, and enough potassium hydroxide to neutralize 50 percent of the carboxylic acid groups of the DP 50 dicarboxylic acid block copolymer. The aqueous emulsion of the DP 50 dicarboxylic block copolymer thus prepared was blended with 110 grams of the previously prepared dispersion of red iron oxide and partially neutralized anionic dispersing agent. This produced an aqueous emulsion having a ratio of red iron oxide to relatively high DP dicarboxylic acid block copolymer of about 1 to 1. The aqueous emulsion containing the red iron oxide pigment particles and dicarboxylic acid block copolymers was then charged to an electrodeposition bath and several metal articles disposed within the bath were electropainted by applying a potential across the several articles and a cathode disposed within the bath. The potential was gradually increased to 200 volts at which time direct current passing though the bath had diminished to a substantially constant value. The resulting coatings on the articles were very good and the red iron oxide pigment particles were fairly uniform throughout the coatings.

In another run, 110 grams additional of the previously prepared dispersion of red iron oxide particles and anionic dispersing agent was added to the aqueous emulsion of DP 50 dicarboxylic acid block copolymer to provide an emulsion having a ratio of red iron oxide pigment to DP 50 dicarboxylic acid block copolymer of about 2 to 1. This aqueous emulsion was then electrodeposited on several metal articles by the same procedure outlined above. The resulting coatings were very good in terms of uniformity of thickness and of the pigment particles in them.

EXAMPLE III

A partially neutralized anionic dispersing agent was prepared by blending together 900 grams deionized water, 300 grams ethylene glycol n-butyl ether, 200 grams dicarboxylic acid block copolymer of $\alpha$-methyl styrene tetramer and 1,3-butadiene having a DP of 14, 300 grams dicarboxylic acid block copolymer of $\alpha$-methyl styrene tetramer and 1,3-butadiene having a DP of 8, and 61 grams of potassium hydroxide. A dispersion of pigment particles and partially neutralized anionic dispersing agent was prepared by blending 6400 grams red iron oxide (R8098), 405 grams of the previously prepared partially neutralized anionic dispersing agent, and 2935 grams deionized water.

An aqueous emulsion of relatively high DP dicarboxylic acid block copolymer was prepared by blending 32 grams ethylene glycol n-butyl ether, 64 grams dicarboxylic acid block copolymer of $\alpha$-methyl styrene tetramer and 1,3-butadiene having a DP of 50, and enough potassium hydroxide to neutralize 50 percent of the dicarboxylic acid groups of the DP 50 dicarboxylic acid block copolymer.

An aqueous emulsion suitable for electrodeposition was prepared by blending 192 grams of the previously prepared dispersion of the pigment particles and partially neutralized anionic dispersing agent, 512 grams deionized water, and the aqueous emulsion containing the DP 50 dicarboxylic acid block copolymer. This resulted in an aqueous emulsion having a ratio of red iron oxide pigment to DP 50 dicarboxylic acid block copolymer of about 2 to 1. The same technique was employed for electrodeposition as outlined in Example II to produce coatings on several articles. The resulting coatings were excellent in uniformity of thickness and in uniformity of pigment concentration.

EXAMPLE IV

A partially neutralized anionic dispersing agent was prepared by blending together 900 grams deionized water, 300 grams ethylene glycol n-butyl ether, 500 grams dicarboxylic acid block copolymer of $\alpha$-methyl styrene tetramer and 1,3-butadiene having a DP of 8, and 42.3 grams potassium hydroxide. A dispersion of pigment particles and partially neutralized anionic dispersing agent was prepared by blending 130 grams red iron oxide (R8098), 11.6 grams of the previously prepared partially neutralized anionic dispersing agent, and enough water to provide a workable slurry.

An aqueous emulsion of DP 50 dicarboxylic acid block copolymer was prepared with the same ingredients and by the same technique outlined in Example II. The previously prepared dispersion of pigment particles and partially neutralized anionic dispersing agent was blended with the aqueous emulsion of the DP 50 dicarboxylic acid block copolymer in an amount sufficient to provide a ratio of red iron oxide pigment to DP 50 dicarboxylic acid block copolymer of about 2 to 1. Several articles were electrodeposited according to the technique outlined in Example II with excellent results. All of the coatings exhibited uniformity in thickness and pigment concentration.

EXAMPLE V

The same procedure outlined in Example IV was repeated using the same materials except a DP 26 dicarboxylic acid block copolymer of $\alpha$-methyl styrene tetramer and 1,3-butadiene was used to prepare the anionic dispersing agent. The aqueous emulsion electrodeposited with excellent results, especially in terms of uniformity of thickness and pigment concentration.

In another run not exemplary of the invention a dispersion was prepared by blending red iron oxide particles with deionized water, ethylene glycol n-butyl ether, and DP 50 dicarboxylic acid block copolymer to provide a red iron oxide to DP 50 dicarboxylic acid block copolymer ratio of about 1 to 1. This aqueous emulsion was electrodeposited by the same technique outlined in Examples II through V. While the resulting coatings were uniform in terms of thickness, the red iron oxide pigment particles were unevenly distributed throughout the coating. The poor pigment particle concentration in the coating results because the DP 50 dicarboxylic acid block copolymer has too high a degree of polymerization to effectively serve as an anionic dispersing agent for the pigment particles.

Although the invention has been described in considerable detail, it must be understood that such detailed description is for the purpose of illustration only and should not be construed as limiting of the invention.

That which is claimed is:

1. A method of electropainting an article in an aqueous electrodeposition bath by electrophoresis comprising the steps of:
   (a) dispersing in said bath as an aqueous emulsion a dispersion comprising pigment particles and an at least partially neutralized anionic dispersing agent comprising a relatively low degree of polymerization dicarboxylic acid of a block copolymer of α-methyl styrene and an aliphatic conjugated diolefin having between 4 and 6 carbon atoms per molecule, inclusive, said block copolymer having the formula:

$$HOOC-(B)_y(A)_x(B)_y-COOH$$

wherein A represents a molecule of the α-methyl styrene after it has become a part of the polymer, x is an integer of between 3 and 6, inclusive, each B represents a molecule of the aliphatic conjugated diolefin after it has become a part of the polymer, each y is an integer of between 1 and about 18, and the HOOC— and —COOH portions represents carboxylic acid groups attached to the ends of the polymer;
   (b) dispersing in said bath as an aqueous emulsion an at least partially neutralized relatively high degree of polymerization dicarboxylic acid of a block copolymer of α-methyl styrene and an aliphatic conjugated diolefin having between 4 and 6 carbon atoms per molecule, inclusive, said block copolymer having the formula:

$$HOOC-(B)_y(A)_x(B)_y-COOH$$

wherein A represents a molecule of the α-methyl styrene after it has become a part of the polymer, x is an integer of between 3 and 6, inclusive, each B represents a molecule of the aliphatic conjugated diolefin after it has become a part of the polymer, each y is an integer of between about 23 and about 60, and the HOOC— and —COOH portions represent carboxylic acid groups attached to the ends of the polymer;
   (c) disposing said article in said bath as an anode in electrical contact with said aqueous emulsion in said bath and in electrical contact with a cathode in contact with said aqueous emulsion in said bath; and
   (d) applying a voltage between said article and said cathode to cause direct current flow through said bath and thereby electrodeposit said dispersion of pigment particles and relatively low DP dicarboxylic acid of said block copolymer and said relatively high DP dicarboxylic of said block copolymer on said article.

2. A method according to claim 1 wherein said relatively low degree of polymerization dicarboxylic acid block copolymer has a degree of polymerization of between 5 and about 40 and wherein said relatively high degree of polymerization dicarboxylic acid block copolymer has a degree of polymerization of between about 50 and about 120.

3. A method according to claim 2 wherein said relatively low degree of polymerization dicarboxylic acid block copolymer and said relatively high degree of polymerization dicarboxylic acid block copolymer are each dicarboxylic acid block copolymers of α-methyl styrene tetramer and 1,3-butadiene.

4. A method according to claim 1 which includes the steps of removing said article from said bath and heating said article to a temperature of between about 250° and about 350° F. to cross-link said electrodeposited discarboxylic acid block copolymers.

5. A method according to claim 1 wherein said electrodeposition bath contains up to about 30 percent by weight solids, wherein said electrodeposition bath is maintained at a temperature of between about 40° and about 200° F., wherein the pH if said electrodeposition bath is between about 7 and about 10, wherein the relatively low degree of polymerization dicarboxylic acid block copolymer and the relatively high degree of polymerization dicarboxylic acid block copolymer each have between about 30 and about 70 percent of the dicarboxylic groups neutralized, wherein the relatively high degree of polymerization dicarboxylic acid block copolymer has an acid number between about 18 and about 37, and wherein said voltage applied between said article and said cathode has a maximum value up to about 300 volts.

6. A method according to claim 1 wherein the dicarboxylic acid groups of said block copolymers are neutralized with a material selected from the group consisting of alkali metal hydroxides and organic amines.

7. An aqueous electrodeposition bath composition for electropainting an anode comprising an aqueous emulsion of:
   (a) a dispersion comprising pigment particles and an at least partially neutralized anionic dispersing agent comprising a relatively low degree of polymerization dicarboxylic acid of a block copolymer of α-methyl styrene and an aliphatic conjugated diolefin having between 4 and 6 carbon atoms per molecule, inclusive, said block copolymer having the formula:

$$HOOC-(B)_y(A)_x(B)_y-COOH$$

wherein A represents a molecule of the α-methyl styrene after it has become a part of the polymer, x is an integer of between 3 and 6, inclusive, each B represents a molecule of the aliphatic conjugated diolefin after it has become a part of the polymer, each y is an integer of between 1 and about 18, and the HOOC— and —COOH portions represent carboxylic acid groups attached to the ends of the polymer; and
   (b) an at least partially neutralized relatively high degree of polymerization dicarboxylic acid of a block copolymer of α-methyl styrene and an aliphatic conjugated diolefin having between 4 and 6 carbon atoms per molecule, inclusive, said block copolymer having the formula:

$$HOOC-(B)_y(A)_x(B)_y-COOH$$

wherein A represents a molecule of the α-methyl styrene after it has become a part of the polymer, x is an integer of between 3 and 6, inclusive, each B represents a molecule of the aliphatic conjugated diolefin after it has become a part of the polymer, each y is an integer of between about 23 and about 60, and the HOOC— and —COOH portions represent carboxylic acid groups attached to the ends of the polymer.

8. An electrodeposition bath composition according to claim 7 wherein said relatively low degree of polymerization dicarboxylic acid block copolymer has a degree if polymerization of between 5 and about 40 and wherein said relatively high degree of polymerization dicarboxylic acid block copolymer has a degree of polymerization of between about 50 and about 120.

9. An electrodeposition bath composition according to claim 7 wherein said relatively low degree of polymerization dicarboxylic acid block copolymer and said relatively high degree of polymerization dicarboxylic acid block copolymer are each block copolymers of α-methyl styrene tetramer and 1,3-butadiene.

10. An electrodeposition bath composition according to claim 7 wherein said aqueous emulsion contains up to about 30 percent by weight solids, wherein the pH of said aqueous emulsion is between about 7 and about 10, wherein said relatively high degree of polymerization dicarboxylic acid block copolymer has an acid number of between about 18 and about 37, and wherein between about 30 and about 70 percent of the carboxylic acid groups of said relatively low degree of polymerization dicarboxylic acid block copolymer and said relatively high dicarboxylic acid block copolymer are neutralized with a material selected from the group consisting of alkali metal hydroxides and organic amines.

References Cited
UNITED STATES PATENTS

| | | | |
|---|---|---|---|
| 3,346,666 | 10/1967 | Dennis | 260—879 |
| 3,448,017 | 6/1969 | Chang et al. | 204—181X |
| 3,448,027 | 6/1969 | Hart et al. | 204—181X |

DANIEL E. WYMAN, Primary Examiner

W. H. CANNON, Assistant Examiner